Figure 1:
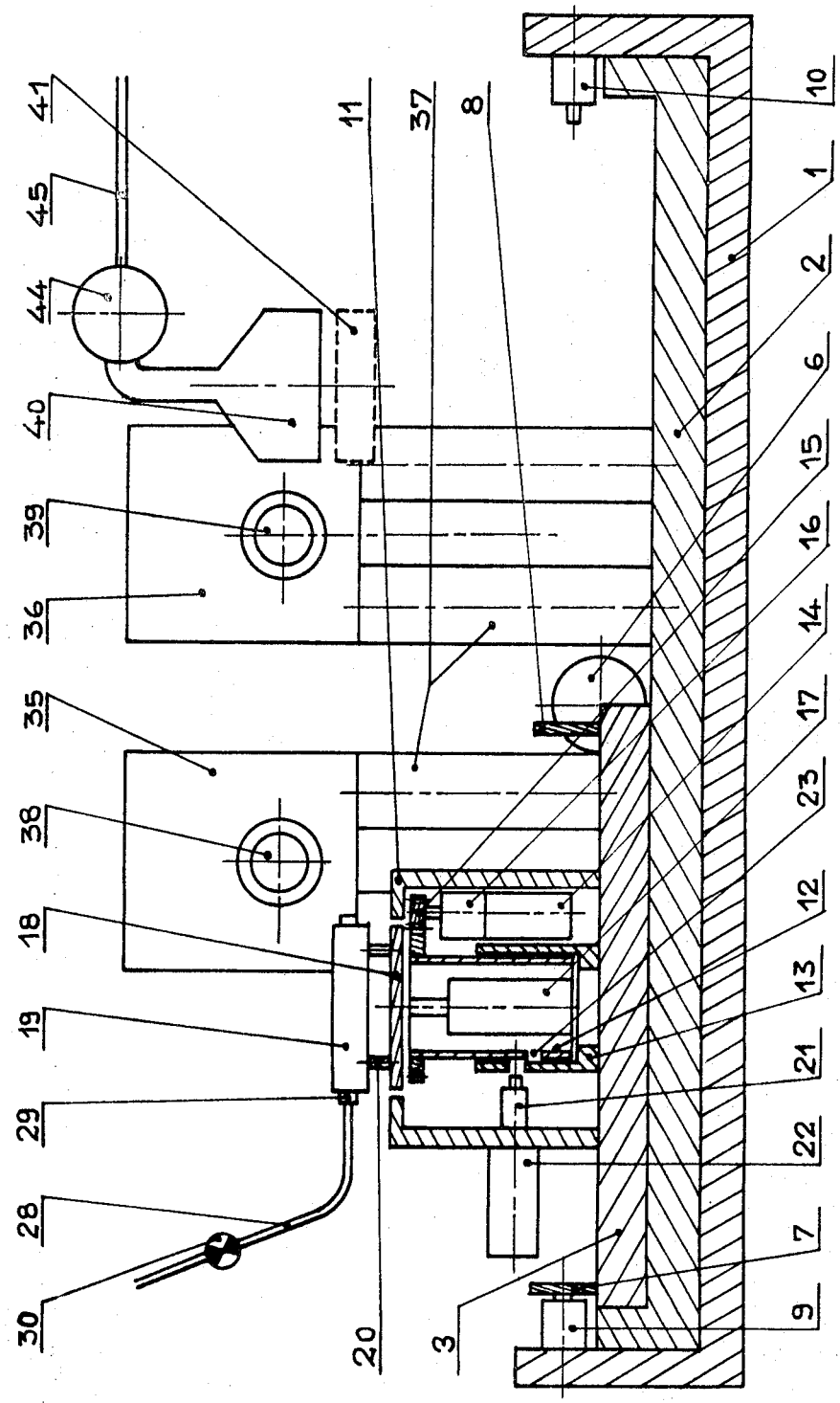

United States Patent

[11] 3,574,257

| [72] | Inventors | Georges Du Bois;<br>Ghislaine Goupil, Paris, France |
|---|---|---|
| [21] | Appl. No. | 819,678 |
| [22] | Filed | Apr. 28, 1969 |
| [45] | Patented | Apr. 13, 1971 |
| [73] | Assignee | Societe Lignes Telegraphiques Et<br>Telephoniques<br>Paris, France |
| [32] | Priority | May 10, 1968 |
| [33] | | France |
| [31] | | 151,382 |

[54] AUTOMATIC CUTTING OF A SUBSTRATE COATED WITH THIN LAYERS
3 Claims, 6 Drawing Figs.

[52] U.S. Cl. ................................................. 29/424,
83/170, 269/7
[51] Int. Cl. ................................................... B23p 17/00

[50] Field of Search .......................................... 29/424,
423, 412, 583; 269/7; 83/15, 16, 170 (X)

[56] References Cited
UNITED STATES PATENTS

| 2,586,532 | 2/1952 | Granfield | 29/424X |
| 2,855,664 | 10/1958 | Griffith et al. | 29/424 |
| 3,083,002 | 3/1963 | Lacey, Jr. | 269/7 |
| 3,247,589 | 4/1966 | Burns | 29/424 |

Primary Examiner—John F. Campbell
Assistant Examiner—Victor A. DiPalma
Attorney—Kemon, Palmer & Estabrook ABSTRACT: A process for cutting a substrate the surface of which bears a large number of identical or different components and which are formed at least to some extent by thin films. The substrate is kept stationary relatively to the cutting tool by immersion in a liquid and freezing thereof. The liquid may be water.

AUTOMATIC CUTTING OF A SUBSTRATE COATED WITH THIN LAYERS

BACKGROUND OF THE DISCLOSURE

Many delicate operations are involved in the manufacture of miniaturized components, but they show such size and reliability advantages that their industrial growth has been rapid in recent years. Consequently, to reduce their production cost, very thorough automation of production is essential, but the reproducibility required for the production of homogeneous equipment must be achieved. Automating leads to the simultaneous manufacture of the largest batches possible.

This invention is connected with this trend and relates to a cutting process used at the stage of separating individual components which have been produced simultaneously in a large number. This operation step occurs inter alia in the manufacture of miniaturized components such as printed circuits, thin-film circuits, hybrid circuits and thick-film circuits. The problem arising in any kind of circuit is the same—how to cut accurately a mechanical substrate in the general form of a sheet having at least one surface bearing a large number of identical components or of subassemblies of components so as to form independent elements. Whether these sheets are used as such or as a backing elements, for instance as a printed-circuit plates, cutting must be very efficient as regards separation into identical items and protection of the or each surface bearing the layers. Securing the sheets is therefore a very delicate problem.

BRIEF DISCLOSURE OF THE INVENTION

The process according to the invention automatically provides very accurate cutting of sheets which cannot be fastened. This process can usually be used in fully automated production lines between the stage at which components are mass-produced on a single substrate and the stage at which discrete components or subassemblies are assembled. No special operation is required to carry the invention into practice.

According to the invention, the substrate is positioned in a recess on a cutting slab, the recess is filled with an easily freezable liquid which does react with the films on the substrate and surround the substrate. The liquid is frozen. The substrate is sawed, while the liquid is maintained frozen. Then the liquid is unfrozen and the cut parts are received in a receptacle.

The choice of substance for securing the substrate to the cutting slab is a means of obviating the risks of contaminating the sheet and of adding impurities as occurs with the adhesives used in the prior art. The use of a substance which is liquid at ambient temperature and the cooling provided compensates for the heating which is inevitably associated with sawing, so that expansion is obviated, heating is compensated for, mechanical accuracy is increased and, more particularly, any degradation of components which are, as a rule, sensitive to local heating is obviated. The process also obviates the need for adhesive and for subsequent cleaning of the soiled surface. Also, the sheets are cut into oblong elements automatically in a single pass in two directions at right angles to one another.

DETAILED DISCLOSURE OF THE INVENTION

Figure 2:
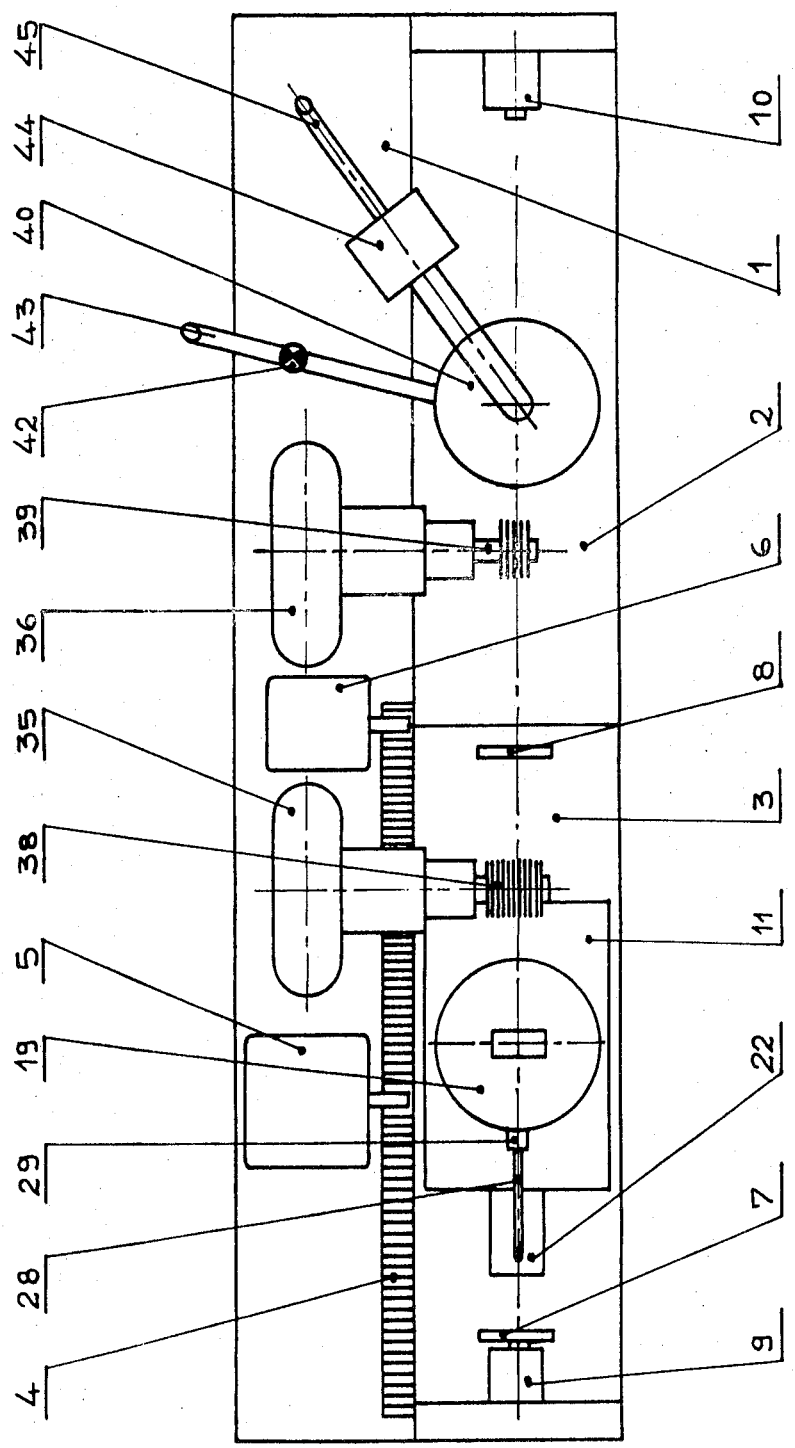
Figure 3:
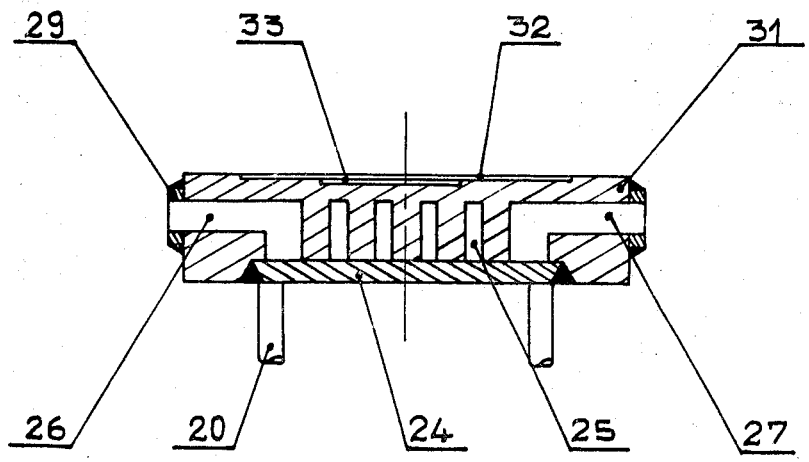
Figure 4:
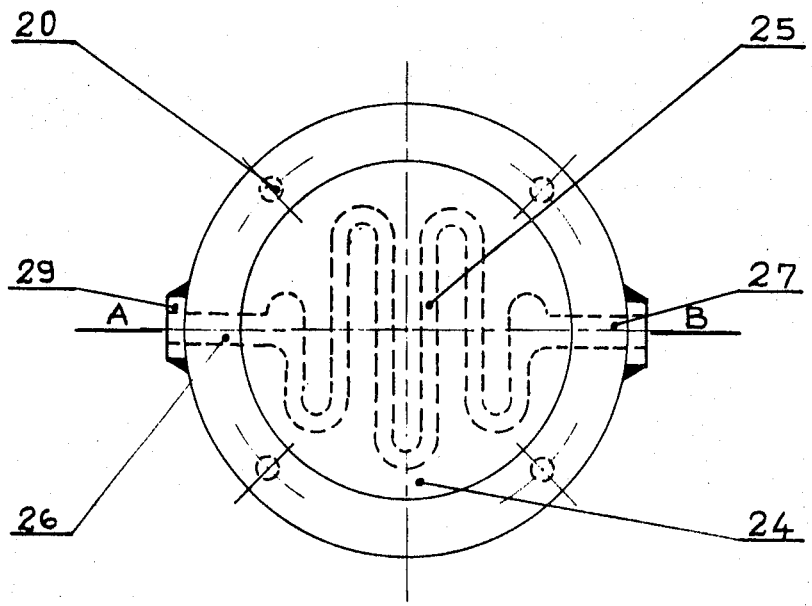
Figure 5:
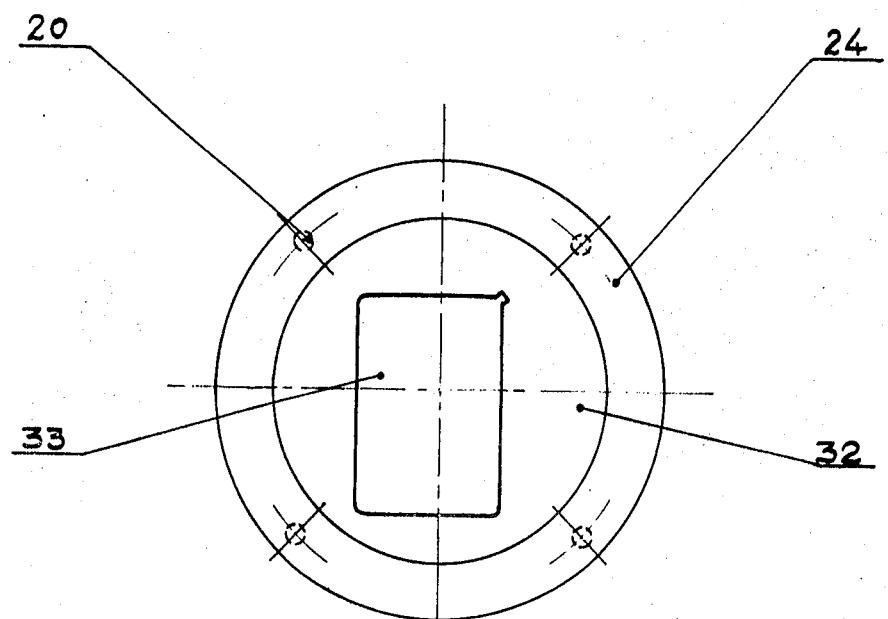
Figure 6:
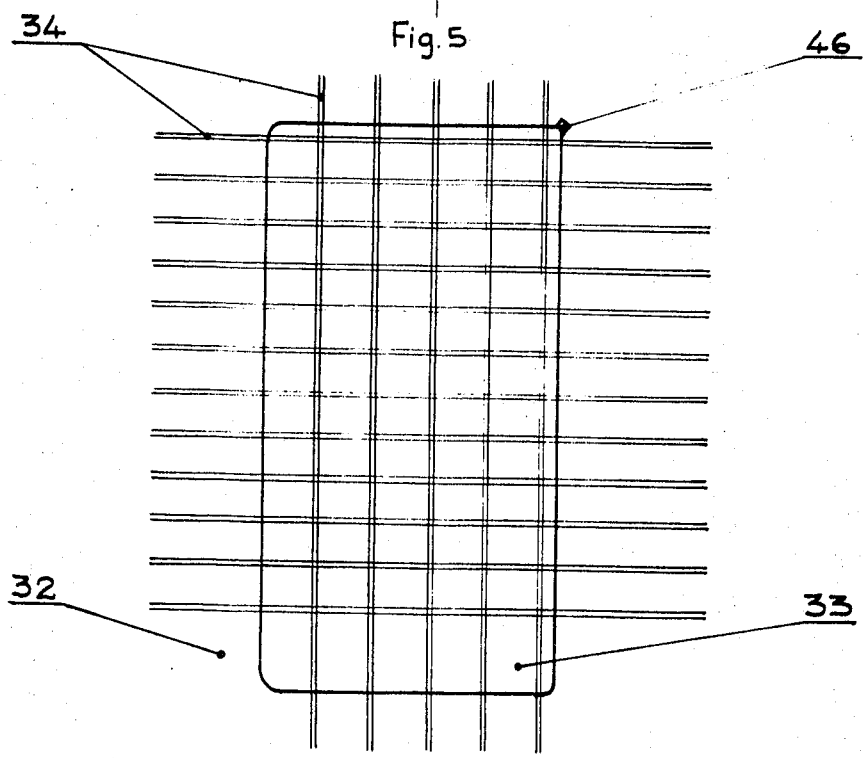

The invention will be more clearly understood if reference is made to the following description and to the accompanying drawings showing an apparatus for performing the preferred variant of the invention, in which:

FIG. 1 is a sectioned view of the apparatus;
FIG. 2 is a plan view of the apparatus;
FIG. 3 is a sectioned view of the cutting slab;
FIG. 4 is a plan view of the cutting-slab base;
FIG. 5 is a plan view of the cutting-slab surface; and
FIG. 6 shows a detail of the cutting-slab surface.

The main parts of the apparatus are a frame, a slideway, a moving pedestal, an interchangeable cutting slab, two sawing trains, a cooling system and a device for removing cut articles.

Referring to FIGS. 1 and 2, the slideway secured to frame 1 comprises a stationary pedestal or plinth or the like 2 and a movable plate 3 which is adapted to move lengthwise over the whole length of the pedestal 2 by means of needle bearings having a clearance of 1 mm. or less. Two motors 5, 6 can, via a toothed rack 4 (instead of a toothed rack, a worm can be used in another variant of the apparatus) rigidly secured to plate 3 reciprocate the same. Motor 5, which is associated with a speed-control facility, controls movement of plate 3 during sawing, and motor 6 provides a rapid return of plate 3 to its initial position upon the completion of sawing. Plate 3 has at its ends two abutments 7, 8 which at the ends of plate travel abut switches 9, 10 secured to frame 1.

A moving pedestal 11 is rigidly secured to plate 3 and has mounted on it a cylinder 12 rotatable around its axis and engaged in a jacket 13 rigidly secured to plate 3. The cylinder 12 fits in the jacket 13 with a clearance of 0.01 mm. Via an electromagnetic clutch 16 and a gearwheel 15, cylinder 12 is rotated by a motor 14. A jack 17 rigidly secured to cylinder 12 can raise a plate 18 through a height of 5 mm. and return the plate 18 to its normal position. A cutting slab 19 rests by way of four pillars, as 20, on plate 18. A bolt 21 operated by an actuator 22 is adapted to engage in two series of apertures, as 23, in jacket 13 and cylinder 12 along two axes at right angles to one another; the cylinder 12 and therefore the slab 19, can therefore be locked in two positions at a 90° offset from one another. Slab 19 is interchangeable and is released by being removed from the pillars 20. A cutting slab can therefore be prepared for each required production job and positioned when it is required to be used without any need to modify the apparatus.

The general construction of the cutting slabs is shown in FIGS. 3—6. Slab base 24 is formed with a groove 25 forming a duct with outlets at places 26, 27; when plate 3 is in the loading position, liquid nitrogen supplied via a pipe 28 and spigot 29 (FIGS. 1 and 2) can flow through the duct formed by the groove 25. Liquid nitrogen flow is controlled by an electrovalve 30. The slab top surface 31, visible in FIGS. 3, 5 and 6 are adapted to receive the sheets for cutting, is formed to a depth of 1 mm. with a first circular recess 32 which is filled with a liquid when the sheet for cutting is placed on the slab. At its center is a further recess 33. The shape and dimensions thereof depend upon the production standards of the sheets to be positioned on the slab, as does the system used to position sheets in the further recess 33. For positioning on the slab the sheet has reference marks identical to those used in the prior phases of manufacture.

The slab top surface is also formed with a rectangular net 34 of grooves which have a depth of 0.5 mm. referred to the bottom of the further recess 33. The grooves 34 enable saws to pass and their width depends upon the thickness of the particular sawing tools used, while the number of grooves in both directions depends upon the cutting planning of the sheets.

Two spindle supports 35, 36, visible in FIGS. 1 and 2, are secured to frame 1 by way of columns, as 37, whose height can be adjusted so that the axis of interchangeable spindleheads 38, 39 can be positioned at the required level. The sawing tools used depend of course upon the nature of the sheet and can take the form, for instance, of diamond-tipped discs. They are fitted to the interchangeable heads 38, 39 which independent motors rotate around their axes at high speed. The sawing stations are covered by a cover (not shown) in which cooled gaseous nitrogen flows to prevent the ice from melting during sawing operations. An unloading station 40, visible in FIGS. 1 and 2, is provided after the sawing stations. Upon reaching the unload position, the cutting slab 19 shown at this station as a dashed rectangle 41 is raised and applied to the bottom aperture of the station 40, with the interposition of a sieve (not shown). Under the control of an electrovalve 42, a stream of hot air is delivered through a tube 43 on to the cut sheets to accelerate the melting of the ice. The water arising from the melting of the ice is sucked away through a venturi pump 44 and removed through a tube 45; the suction applied by the device 44 maintains the sheet elements in engagement with the sieve associated with the bottom orifice of the unloading station 40. When pumping ceases, the cut items disengage and drop into an appropriate receptacle.

The operation of the apparatus will be described with reference to the example of an embodiment devised by the applicants to cut alumina substrates used as substrates for thin-film circuits. This description, however, is not intended to limit the scope of this invention, since one of the main features thereof is precisely that it can be adapted to the manufacture of a variety of miniaturized elements. To effect such adaptation, all that is necessary is to change the cutting slab and the spindleheads bearing the sawing tools.

The substrates used in this manufacture are alumina sheets 50 mm. long, 25 mm. wide and 0.7 mm. thick, each sheet bearing 44 circuits which it is required to separate from one another without damage to the surface bearing the film. Previously during manufacture of the thin-film components the substrates are given reference marks, for instance, of the kind disclosed in U.S. application Ser. No. 779,792 filed Nov. 29, 1968 entitled "Improved apparatus for the relative positioning of two plane parts." A cutting slab is devised on the basis of this centering process. The further recess 33 of FIGS. 5 and 6 is 55 mm. long, 30 mm. wide and 0.5 mm. deep. The corner or angle 46 of FIG. 6 is a reference right angle from whose vertex the net of sawing grooves 34 is traced, such network comprising 12 grooves parallel to the minor side of the reference angle and 5 grooves parallel to the major side of the reference angle. FIG. 1 shows the position of the moving system at the beginning of loading. The substrate to be cut is placed in the further recess 33 and engaged firmly in the reference angle 46 through the agency of a hollow rod which terminates in a rubber-covered ferrule or the like and through which warm air flows, so that the end of the rod is not affected by the freezing of the immersion liquid. Starting up the apparatus automatically initiates the following sequence of operations:

a. An intake of pure water in a quantity sufficient to fill the sawing grooves 34 and completely cover the substrate.

b. Opening of electrovalve 30 for 10 seconds, to give enough time for the liquid nitrogen flow, in the slab base to freeze the water. The substrate is therefore rigidly secured in the further recess 33 and anchored to the cutting slab by the laminae of ice filling the grooves 34.

c. Advance of pedestal 11 to clear spigot 29, positioning of cutting slab at sawing level, and locking of cutting slab in position by means of the devices 17, 22.

d. Advance of pedestal 11 to move cutting slab past the first cutting spindle 38, which is fitted with 12 diamond-tipped circular saws running at 20,000 r.p.m. To reduce melting of the ice during sawing, a flow of nitrogen gas cooled to −80° C. flows in a cover (not shown). Upon the completion of sawing the cutting slab returns to its normal position.

e. Unlocking of cutting slab, which the motor 14 then rotates horizontally through 90°. The slab is locked in this new position by the device 22.

f. Second rise of cutting slab and movement past the second spindlehead 39, which is fitted with five circular saws having the same characteristics as the saws of the head 38. As occurs at the end of the first sawing operation, the cutting slab returns to its initial position.

g. The pedestal 11 stops near the unloading station 40, and the cutting slab is raised and closes the bottom aperture of station 40.

h. Electrovalve 42 opens for an intake of warm air to melt the ice. The 44 discrete integers of the substrate are sucked away and remain in engagement with the grid associated with the bottom orifice at the station 40.

i. Automatic return of plate 3 to the loading station.

j. An alcohol-containing receptacle is presented below the bottom aperture at the station 40, whereafter pumping stops so that the cut articles disengage and drop into the receptacle.

We claim:

1. A process for precise cutting of a sheet bearing a plurality of highly delicate microcircuits consisting of the following steps:
    1. Positioning said sheet in a recess in a cutting slab bearing sawing grooves according to the sawing pattern for said sheet.
    2. Filling said recess and said grooves with a liquid.
    3. Freezing said liquid.
    4. Sawing said sheet on said cutting slab according to the sawing pattern under continued freezing.
    5. Unfreezing said liquid while maintaining said cut sheet parts through suction.
    6. Removing said suction so that said parts are released in a receptacle.

2. A process for precise cutting of a sheet bearing a plurality of highly delicate microcircuits consisting of the following steps:
    1. Positioning said sheet in a recess in a cutting slab bearing sawing grooves according to the sawing pattern for said sheet.
    2. Filling said recess and said grooves with water.
    3. Freezing said water.
    4. Sawing said sheet on said cutting slab according to the sawing pattern under continued freezing.
    5. Unfreezing said water while maintaining said cut sheet parts through suction.
    6. Removing said suction so that said parts are released in a receptacle.

3. a process for precise cutting of a sheet bearing a plurality of highly delicate microcircuits consisting of the following steps:
    1. Positioning said sheet in a recess in a cutting slab bearing sawing grooves according to the sawing pattern for said sheet.
    2. Filling said recess and said grooves with a liquid.
    3. Freezing said liquid by circulating liquid nitrogen in a tubing cut in the cutting slab base.
    4. Sawing said sheet on said cutting slab according to the sawing pattern while flowing cooled nitrogen on the sheet.
    5. Unfreezing said liquid by means of a blow of hot air while maintaining said cut sheet parts through suction.
    6. Removing said suction so that said parts are released in a receptacle.